United States Patent Office 3,644,370
Patented Feb. 22, 1972

3,644,370
ISOINDOLO[1,2-a]ISOQUINOLINES
William J. Houlihan and Robert E. Manning, Mountain Lakes, N.J., assignors to Sandoz-Wander, Inc., Hanover, N.J.
No Drawing. Original application Mar. 15, 1967, Ser. No. 623,239, now Patent No. 3,498,988, dated Mar. 3, 1970. Divided and this application Nov. 17, 1969, Ser. No. 877,452
Int. Cl. C07d 57/04
U.S. Cl. 260—289 R     8 Claims

ABSTRACT OF THE DISCLOSURE

The compounds and certain intermediates are useful as central nervous system stimulants and anti-inflammatories. They are prepared by converting an isoindolo[1,2-a]isoquinoline to its quaternary ammonium salt by treatment with a lower alkyl halide, e.g. methyl iodide, and reducing the salt by sodium in liquid ammonia to cleave the bond common to the five membered ring of the isoindolo moiety and six membered ring to the isoquinolino moiety, thus forming the nine membered N-heterocyclic ring of dibenz[c,f]azonine. For example, 2,3-dimethoxy-7-methyl-5,6,7,8-tetrahydrodibenz[c,f]azonine can thus be prepared from 2,3-dimethoxy-5,6,8,12b-tetrahydroisoindolo-[1,2-a]isoquinoline.

This application is a division application of Ser. No. 623,239 filed March 15, 1967, now U.S. Patent 3,498,988, issued March 3, 1970.

This invention relates to compounds of the following formulae:

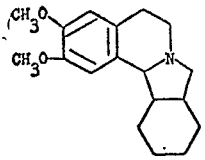

(I)

having a melting point of 57° to 58.5° C;

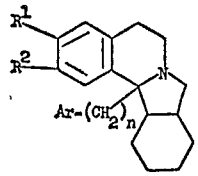

(II)

wherein $n$, Ar, $R^1$ and $R^2$ are as defined below;

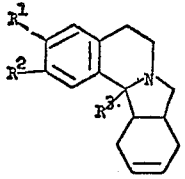

(III)

wherein $R^1$, $R^2$ and $R^3$ are as defined below;

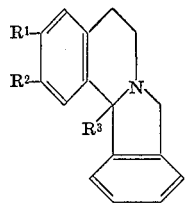

(IV)

wherein $R^1$, $R^2$ and $R^3$ are as defined below; and

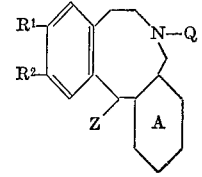

(V)

wherein $n$ is 0 or 1;

$R^1$ and $R^2$ are independently either a hydrogen atom; a linear alkyl group having from one to four carbon atoms; or a linear alkoxyl group having from one to four carbon atoms;

or $R^1$ and $R^2$ may be joined to form a methylenedioxyl radical;

Ar is a radical having the formula:

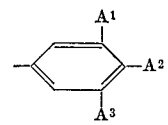

wherein $A^1$, $A^2$ and $A^3$ is independently a hydrogen atom; a fluorine atom; a chlorine atom; a linear alkyl group having from one to four carbon atoms, e.g. methyl; or a linear alkoxyl group, having from one to four carbon atoms; or taken together with its adjacent counterpart, a methylenedioxyl group (—O—$CH_2$—O—)

$R^3$ is a hydrogen atom; Ar or Ar$CH_2$— (as defined above);

Q is a linear alkyl group having from one to four carbon atoms;

Ring A is an ortho-phenylene group, an ortho-cyclohexylene group or an ortho-3-(cyclohexen)ylene radical;

Z is a hydrogen atom; a linear alkyl group having from one to four carbon atoms; an allyl group; a crotonyl group or an organic radical having the formula:

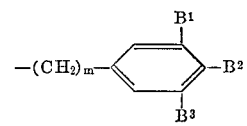

wherein $m$ is 0 or 1;

$B^1$, $B^2$ and $B^3$ are independently a hydrogen atom; a linear alkyl group having from one to four carbon atoms; or a linear alkoxyl group, having from one to four carbon atoms; or taken together with its adjacent counterparts a methylenedioxyl group;

and to intermediates in their peparation and to their pharmaceutically acceptacle acid addition salts and quaternary ammonium salts.

Compounds II include compounds of the classes of Compounds IIa and IIb:

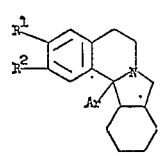 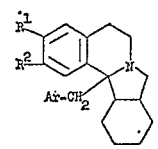

IIa        IIb wherein $R^1$, $R^2$ and Ar are as defined above.

Compound III include compounds of the classes of Compounds IIIa, IIIb and IIIc:

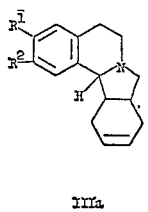 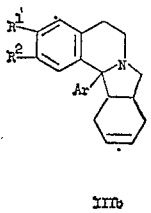 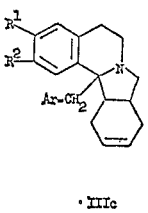

IIIa  IIIb  IIIc wherein $R^1$, $R^2$ and Ar are as defined above.

Compounds IV include compounds of the classes of Compounds IVa, IVb and IVc:

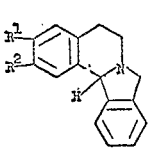 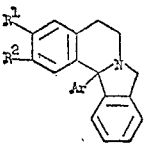 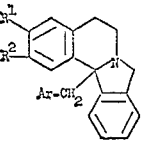

IVa  IVb  IVc wherein $R^1$, $R^2$ and Ar are as defined above.

Compounds I, IIa, IIb, and V may be prepared according to reaction schemes A, B, C and D presented below. In the reaction schemes $R^1$, $R^2$, $R^3$, Ar, Ring A, Z and Q are as defined above, and Y is a lower hydrocarbon group, e.g. an allyl group; a crotonyl group; or a linear alkyl group having from one to four carbon atoms, or $R^3$, and X is a chlorine atom; a bromine atom; or in iodine atom.

Compounds IIIa and IVa; Compounds IIIb and IVb and Compounds IIIc and IVc may also be prepared by procedures similar to reaction schemes A, B, and C respectively, as is hereinafter described.

According to the reaction scheme A for the preparation of Compound I, Step a is a condensation reaction which may be effected by heating VI, i.e. 3,4-dimethoxyphenylethylamine, and VII, i.e. cis-1,2-cyclohexane dicarboxylic acid anhydride, in a solvent, e.g. refluxing in orthodichlorobenzene, to form the imide (VIII:1), i.e. 2[2-(3,4 - dimethoxyphenyl)ethyl]2,3,3a,4,5,6,7,7a-octahydro-1H-isoindolo-1,3-dione.

Step b is a reduction of VIII:1 to the hydroxy amide (IX), i.e. 2-[2-(3,4-dimethyloxylphenyl)ethyl]-1-hydroxy-2,3,3a,4,5,6,7,7a-octahydro-1H-isoindol - 3 - one, e.g. by treatment with sodium borohydride (NaBH$_4$) in methanol at room temperature, i.e. 20° C.

Step c is a cyclization of IX by heating in the presence of a strong acid, e.g. refluxing with concentrated hydrochloric acid in methanol, to the lactam (X:1), i.e. 2,3-dimethoxy-5,6,8,8a,9,10,11,12,12a,12b-decahydro - 8 - oxoisoindolo[1,2-a]isoquinoline.

Step d is a reduction of X:1 to Compound I, e.g. by refluxing with lithium aluminum hydride (LAH) in diethyl ether (ether).

According to reaction scheme B, for the preparation of a Compound IIa, Step a is a condensation, which may be effected by heating (VIa), e.g. phenylethylamine, with XI, e.g. ortho-benzoyl hexahydrobenzoic acid, in the presence of an acid, i.e. heating with a small amount of p-toluenesulfonic acid in toluene, to form the intermediate XII.

Step b is a cyclization of Compound XII which may be effected by heating in the presence of a strong acid, e.g. heating with concentrated hydrochloric acid in methanol, to give the lactam (X:2a) related to Compound IIa.

In Step c X:2a is reduced to Compound IIa, e.g. by heating with borane in tetrahydrofuran (THF) or with LAH in ether.

According to reaction scheme C for the preparation of a Compound IIb, Step a is a condensation of Com- Reaction Scheme A

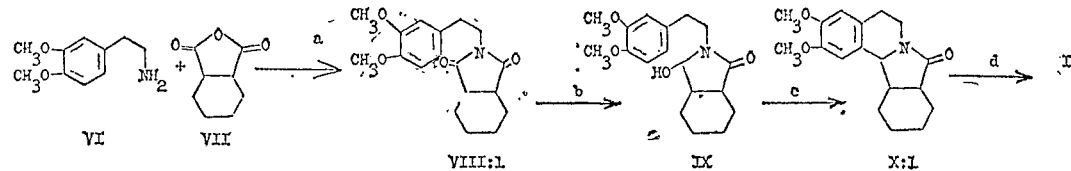

Reaction Scheme B

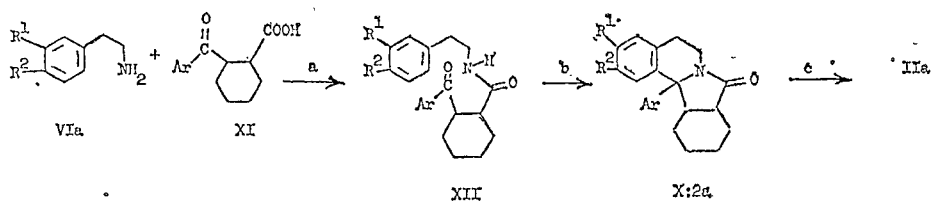

Reaction Scheme C

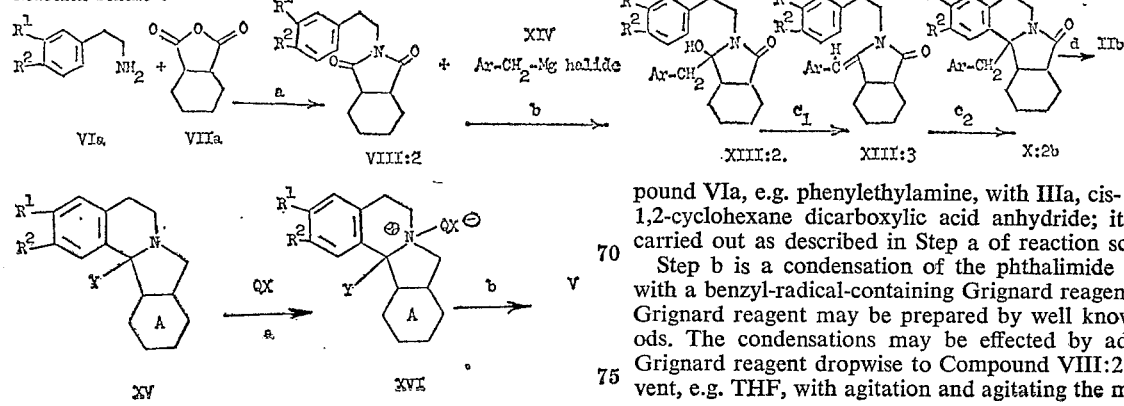

pound VIa, e.g. phenylethylamine, with IIIa, cis- or trans-1,2-cyclohexane dicarboxylic acid anhydride; it may be carried out as described in Step a of reaction scheme A.

Step b is a condensation of the phthalimide (VIII:2) with a benzyl-radical-containing Grignard reagent. Such a Grignard reagent may be prepared by well known methods. The condensations may be effected by adding the Grignard reagent dropwise to Compound VIII:2 in a solvent, e.g. THF, with agitation and agitating the mixture at room temperature for a suitable period of time, e.g. from 4 to 24 hours, to form the intermediate XIII:2.

Step c is a two-stage cyclization which may be effected by heating compound XIII:2 in the presence of a strong acid, e.g. refluxing with concentrated hydrochloric acid in methanol, to give the dehydrated amide XIII:3 which then cyclizes to the lactam (X:2b).

Step d is a reduction. The lactam (X:2b) is reduced to the Compound IIb, e.g., by the method described in Step c of reaction scheme B.

Reaction scheme B is preferred for the preparation of Compounds IIa, which compounds have a phenyl radical. However, Compounds IIa can also be prepared by the procedure of reaction scheme C by using a phenyl-radical-containing Grignard reagent (XIV). Similarly, while reaction scheme C is preferred for the preparation of Compounds IIb, which compounds have a benzyl radical, said compounds may also be obtained by the procedure of reaction scheme B by using an o-(benzylcarbonyl)-hexahydrobenzoic acid

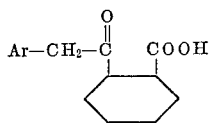

wherein Ar is as defined above; in place of Compound XI.

In the preparation of Compound IIa by reaction scheme B, if one starts with phenylethylamine (as VIa) and ortho-benzoylhexahydrobenzoic acid (as XI), 12b-phenyl-5,6,8,8a,9,12,12a,12b - octahydroisoindolo - [1,2-a]isoquinoline is obtained as the Compound IIa. When a compound VIa is used wherein $R^1$ and $R^2$ each are a linear alkoxyl group, e.g. methoxy, ethoxy, propoxy or butoxy, the corresponding Compound IIa is obtained, i.e. wherein $R^1$ and $R^2$ each are a linear alkoxy group. Similarly, if a Compound VIa is used wherein $R^1$ and $R^2$ each are a linear alkyl group, e.g. methyl ethyl, propyl and butyl, the corresponding Compound IIa is obtained, i.e. wherein $R^1$ and $R^2$ each are a linear alkyl group.

If a methylenedioxy-containing phenylethylamine is used, the corresponding Compound IIa is obtained, i.e. wherein $R^1$ and $R^2$ are joined to form methylenedioxy.

Similarly, in the preparation of Compound IIa, if in place of ortho-benzoylhexahydrobenzoic acid, i.e. Compound XI wherein each of $A^1$, $A^2$ and $A^3$ is a hydrogen atom, one uses, e.g. ortho-(p-chlorobenzoyl)hexahydrobenzoic acid, the corresponding Compound IIa is obtained, i.e. wherein $A^1$ and $A^3$ are hydrogen atoms and $A^2$ is chloro. Similarly, if one uses as XI a compound wherein any of $A^1$, $A^2$ or $A^3$ is butyl, chloro or fluoro, the corresponding Compound IIa is obtained. If ortho-(p-methoxybenzoyl)hexahydrobenzoic acid, i.e. a Compound XI wherein $A^2$ is methoxy, i.e. a lower alkoxy and each of $A^1$ and $A^3$ is a hydrogen atom, the corresponding Compound IIa is obtained. If ortho-(propylbenzoyl)-hexahydrobenzoic acid is used, i.e. a Compound XI wherein one of $A^1$, $A^2$ and $A^3$ is a lower linear alkyl group, the corresponding Compound IIa is obtained. If a methylenedioxy-containing ortho-benzoylhexahydrobenzoic acid is used as XI, the corresponding Compound IIa is obtained.

Variation of the starting materials, discussed above with respect to the preparation of the corresponding Compounds II, also applies to the preparation of Compounds II and IV discussed below, as well as intermediates and derivatives thereof unless specifically noted.

Compounds IIIa may be obtained by following the general procedure of reaction scheme A, but replacing the 1,2-cis-cyclohexane dicarboxylic acid anhydride with 4-cyclohexene-1,2-dicarboxylic acid anhydride. Similarly, Compounds IVa may be obtained by following the general procedure of reaction scheme A, but replacing the 1,2-cis-cyclohexane dicarboxylic anhydride with phthalic acid anhydride.

By selection of phenylethylamines having $R^1$ and $R^2$ as defined above, the corresponding Compounds IIIa and IVa may be obtained.

Following the general procedures of reaction schemes B or C, but using 4-cyclohexene-1,2-dicarboxylic acid anhydride in place of the 1,2-cyclohexane dicarboxylic acid anhydride, the corresponding Compound IIIb or IIIc, may be obtained.

Following the general procedure of reaction scheme B or C, but using phthalic acid anhydride in place of the 1,2-cyclohexane dicarboxylic acid anhydride, the corresponding Compound IVb or IVc, may be obtained By selection of starting materials having the substituents as defined above, the corresponding Compounds III and IV may be obtained.

According to reaction scheme D for the preparation of Compounds V, Step a is a conversion of a Compound XV to the corresponding quaternary ammonium salt by treatment with QX, a lower alkyl halide, e.g. methyl iodide; preferably in a solvent, such as ether or ethanol.

Step b is a reduction. The reduction may be effected by the use of sodium in liquid ammonia.

Compounds XV include Compounds I, II, III and IV and may be prepared according to reaction scheme A, B or C, whichever is appropriate. Compounds XV having a lower hydrocarbon group as Y substituent may be prepared according to the procedure of reaction scheme B by using the appropriate ortho-acylbenzoic acid for XI in Step a. Similarly, Compounds XV having a lower hydrocarbon group as the Y substituent may also be prepared according to the procedure of reaction scheme C by using the appropriate lower hydrocarbon-group-containing Grignard reagent for XIV in Step b.

It is also possible, according to reaction scheme D, to prepare Compounds V from analogues of XV bearing halogen atoms, e.g. fluorine, chlorine or bromine atoms; the halogen atoms being replaced by hydrogen atoms during the reduction (Step b) to give the corresponding Compound V bearing hydrogen in place of the halogen atoms. It is preferred, however, to use halogen-free Compounds XV related to the desired Compound V.

The reaction schemes A, B and C may be varied to obtain the desired compounds and intermediates of this invention, however, borane should not be used in carrying out the reductions of carbonyl-group-containing intermediates of Compounds III or any other compounds of this invention which also have ethylenically unsaturated double bonds, e.g. allyl groups, as its use leads to reaction at double bonds as well as carbonyl groups. For example, this could lead to the conversion of a Compound III to a Compound II. LAH, however, may be used in such instances.

Compounds I, III, and V and their pharmaceutically acceptable acid addition and quaternary ammonium salts are central nervous system (CNS) active compounds. They are useful, e.g. as CNS stimulants, hypotensives and anti-inflammatories. They are administered to mammals either orally or parenterally in daily doses of from 0.5 to 10 mg./kg. of body weight, e.g. from 30 to 600 milligrams per diem, preferably administered in divided doses from 2 to 4 times a day; a single daily oral dose of up to 200 milligrams is also acceptable.

The acid addition and quaternary ammonium salts of Compounds I, III, and V are prepared according to well known procedures from Compounds I, III, and V, respectively. They are all useful, in accord with recognized procedures, for the preparation of corresponding pharmaceutically acceptable salts.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkylsulfonic acid, such as methylsulfonic acid ($H_3C-SO_3H$); dibasic acids, e.g. succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicyclic acid and arylsulfonic acids, such as phenylsulfonic acid. The only limitation on the acid is that the resulting salt be pharmaceutically acceptable; it is preferred, however, that the acid addition salt be water-soluble.

Each of the pharmaceutically active compounds of this invention may be e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compound is:

| | Parts |
|---|---|
| Title compound of Example 1 | 30 |
| Tragacanth | 2 |
| Lactose | 59.5 |
| Corn starch | 5 |
| Talcum | 3 |
| Magnesium stearate | 0.5 |
| Alcohol SD–30, q.s. | |
| Purified water, q.s. | |

Examples illustrative of this invention follow. In the examples all temperatures are centigrade and all percents and parts are by weight, unless specified otherwise. Parts by weight are related to parts by volume as a kilogram is related to a liter.

EXAMPLE 1

2,3-dimethoxy-5,6,8,8a,9,10,11,12,12a,12b-decahydroisoindolo[1,2-a]isoquinoline

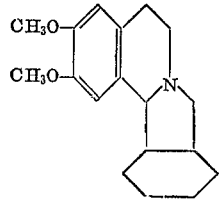

This example illustrates the preparation of 2,3-dimethoxy - 5,6,8,8a,9,10,11,12,12a,12b - decahydroisoindolo[1,2-a]isoquinoline, i.e. Compound I, by following a procedure according to reaction scheme A described above. Compound I is useful as an intermediate in the preparation of 9,10-dimethoxy-3-methyl-5,6-tetramethylene-1H-2,3,4,5,6,7-hexahydro-3-benzazonine, i.e. a Compound V, illustrated by Example 2.

(a) Preparation of 2-[2-(3,4-dimethoxyphenyl)ethyl]-2,3,3a,4,5,6,7,7a-octahydro-1H-isoindol-1,3-dione

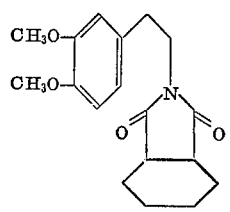

A solution of 90.5 parts of 3,4-dimethoxyphenylethylamine and 77 parts of cis-1,2-cyclohexanedicarboxylic anhydride in 100 parts by volume of ortho-dichlorobenzene is refluxed under a water separator for 3 hours, then allowed to cool and stand at room temperature for 16 hours. Crystals formed are collected as 118 parts of Compound (a), melting point (M.P.) 85° to 88° C.

(b) Preparation of 2-[2-(3,4-dimethoxyphenyl)ethyl]-1 - hydroxy - 2,3,3a,4,5,6,7,7a-octahydro-1H-isoindol-3-one

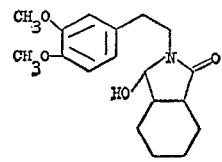

Twenty parts of Compound (a) are suspended with stirring in 150 parts by volume of methanol cooled in a water bath at room temperature. 3.9 parts of sodium borohydride ($NaBH_4$) in 50 parts by volume of methanol is added in two portions over 5 minutes. The mixture is allowed to stand for 35 minutes and then diluted with water to 800 parts by volume. The mixture is then cooled for 15 minutes in an ice bath and filtered, yielding crude compound (b); on recrystallization from methanol-ether, compound (b), M.P. 136° to 138° C., is obtained.

(c) Preparation of 2,3-dimethoxy-5,6,8,8a,9,10,11,12,12a,12b-decahydro-8-oxo-isoindolo[1,2-a]isoquinoline

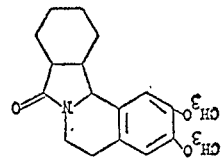

Eleven parts of compound (b) in 100 parts by volume of methanol and 3 parts by volume of concentrated hydrochloric acid are heated under reflux for 2 hours. The mixture is then cooled, concentrated under vacuum, diluted with water and extracted with ether. The ether phase is dried over sodium sulfate and evaporated under vacuum. The residue is crystallized from ether to give 7 parts of Compound (c), M.P. 112° to 114° C.

(d) Preparation of 2,3-dimethoxy-5,6,8,8a,9,10,11,12,12a, 12b-decahydroisoindolo[1,2-a]isoquinoline Thirty-five parts of Compound (c) in a Soxhlet extractor over a flask containing 20 parts of lithium aluminum hydride (LAH) in 1,800 parts by volume of ether are heated under reflux for 43 hours. The reaction mixture is decomposed with water and filtered with "Celite," (diatomaceous earth). The filtrate is evaporated under vacuum. Thirty parts of residue are obtained, and crystallized from pentane to give 15 parts of the title compound, M.P. 57° to 58.5° C.

EXAMPLE 2

9,10-dimethoxy-3-methyl-5,6-tetramethylene-1H-2,3,4,5, 6,7-hexahydro-3-benzazonine hydrochloride

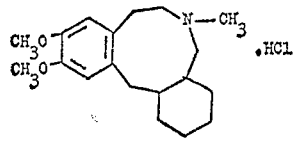

This example illustrates the preparation of a Compound V by a procedure according to reaction scheme D, described above.

(a) Preparation of 2,3-dimethoxy-5,6,8,8a,9,10,11,12,12a, 12b-decahydroisoindolo[1,2-a]isoquinoline methiodide

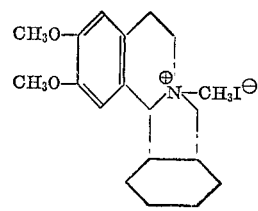

A solution of 4 parts of 2,3-dimethoxy-5,6,8,8a,9,10,11,12,12a,12b-decahydroisoindolo[1,2-a]isoquinoline in 4 parts by volume of ethanol and 25 parts by volume of ether and 7 parts by volume of methyl iodide is allowed to stand at room temperature about 16 hours yielding 4 parts of the corresponding methiodide, i.e. Compound (a).

(b) Preparation of 9,10,dimethoxy-3-methyl-5,6-tetramethylene-1H-2,3,4,5,6,7-hexahydro-3-benzazonine hydrochloride 6.5 parts of sodium is added to 26 parts of Compound (a) in 500 parts of liquid ammonia cooling in a solid carbon dioxide-acetone bath. After stirring for 1 hour the solution is allowed to evaporate for 16 hours. The residue is mixed with water and chloroform. The chloroform layer is dried over sodium sulfate and evaporated under vacuum. The residue is converted to the hydrochloride and crystallized from ethanol-ether to give 10 parts of the title compound, M.P. 230° to 232° C.

Replacing the methyl iodide of this example with ethyl bromide results in the preparation, in a similar manner, of the corresponding compound V, i.e. 9,10-dimethoxy-3-ethyl-5,6-tetramethylene-1H-2,3,4,5,6,7-hexahydro-3-benzazonine.

EXAMPLE 3

2,3-dimethoxy-5,6,8,8a,9,12,12a,12b-octahydroisoindolo-[1,2-a]isoquinoline

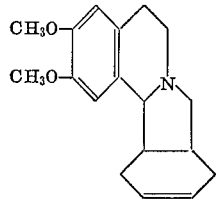

This example illustrates the preparation of 2,3-dimethoxy-5,6,8,8a,9,12,12a,12b - octahydroisoindolo[1,2 - a]isoquinoline which is a compound IIIa, by a process similar to that described in Example 1. This compound may be used for the preparation of the corresponding compound V, i.e. 9,10-dimethoxy-3-methyl-5,6-butenylene-1H-2,3,4,5,6,7-hexahydro-3-benzazonine, as illustrated in Example 4.

(a) Preparation of 2-[2-(3,4-dimethoxyphenyl)ethyl]-2,3,3a,4,7,7a-hexahydro-1H-isoindol-1,3-dione

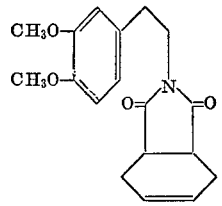

A solution of 18.1 parts of 3,4-dimethoxyphenylethylamine and 15.2 parts of cis-4-cyclohexene-1,2-dicarboxylic acid anhydride in 20 parts by volume of ortho-dichlorobenzene is heated under reflux for 3 hours. The reaction mixture is cooled and diluted with 100 parts by volume of ether. Thirty-one parts of Compound (a), having a melting point of 107° to 109° C., are recovered from the reaction mixture.

(b) Preparation of 2-[2-(3,4-dimethoxyphenyl)ethyl]-1-hydroxy-2,3,3a,4,7,7a-hexahydro-1H-isoindol-3-one

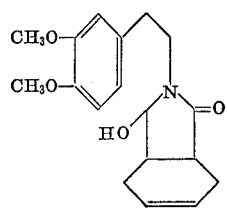

In a vessel 20 parts of Compound (a) are suspended in 150 parts by volume of methanol with stirring in a water bath at room temperature. Four parts of sodium borohydride (NaBH$_4$) in 50 parts by volume of methanol are added and the mixture stirred for 40 minutes. The mixture is then diluted with 150 parts by volume of water and cooled yielding 15 parts of Compound (b) as crystals, M.P. 134° to 136° C.

(c) Preparation of 2,3-dimethoxy-8-oxo-5,6,8,8a,9,12,12a,12b-octahydroisoindolo[1,2-a]isoquinoline

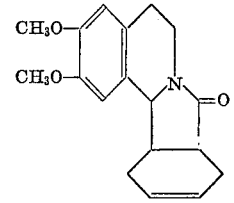

Thirteen parts of Compound (b) are refluxed for 2 hours in 150 parts by volume of methanol and 5 parts by volume of concentrated hydrochloric acid. The reaction mixture is concentrated under vacuum, diluted with aqueous sodium carbonate solution, then extracted with methylene chloride. The organic extract is dried over sodium sulfate and then evaporated yielding a residue which on crystallization from ether gives 9 parts of Compound (c), M.P. 89° to 92° C.

(d) Preparation of 2,3-dimethoxy-5,6,8,8a,9,12,12a,12b-octahydroisoindolo[1,2-a]isoquinoline Thirty-seven parts of Compound (c) is placed in a Soxhlet extractor over a flask containing 21 parts of LAH and 2,100 parts of ether and the mixture refluxed for 16 hours. Thirty-five parts of the title compound are obtained as a syrup which slowly crystallizes on standing, M.P. 72° to 74° C.

Replacing the 3,4 - dimethoxyphenylethylamine with 4-methoxyphenylethylamine results in the preparation, in a similar manner, of the corresponding Compound IIIa, i.e. 2 - methoxy-5,6,8,8a,9,12,12a,12b-octahydroisoindolo-[1,2-a]isoquinoline.

EXAMPLE 4

9,10-dimethoxy-3-methyl-5,6-butenylene-1H-2,3,4,5,6,7-hexahydro-3-benzazonine hydrochloride

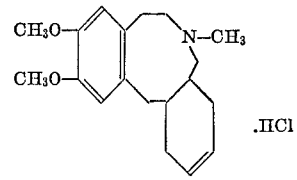

This example illustrates the preparation of 9,10-dimethoxy-3-methyl - 5,6 - butenylene-1H-2,3,4,5,6,7-hexahydro-3-benzazonine which is a Compound V, by a process similar to that described in Example 2.

Twenty-five parts of 2,3-dimethoxy-5,6,8,8a,9,12,12a-12b-octahydroisoindolo[1,2-a]isoquinoline is dissolved in 70 parts by volume of ethanol and 40 parts by volume methyl iodide and the solution allowed to stand for several hours. Thirty-two parts of the corresponding methiodide is collected as crystals from the solution.

2.6 parts of sodium is added to a suspension of 25 parts of the methiodide in liquid ammonia with stirring while cooling in a solid carbon dioxide-acetone bath. After stirring for one hour the mixture is allowed to evaporate for 16 hours. The residue is mixed with water and chloroform. The chloroform layer is dried over sodium sulfate and evaporated under vacuum. The residue is converted to the hydrochloride and crystallized from an ethanol-benzene-ether solution to give 9 parts of the title compounds, M.P. 155° to 159° C.

Following the procedure described in this example but using ethyl iodide in place of the methyl iodide the corresponding Compound V is obtained, i.e. 9,10-dimethoxy-3-ethyl-5,6-butylene - 1H - 2,3,4,5,6,7 - hexahydro-3-benzazonine.

EXAMPLE 5

2,3-dimethoxy-5,6,8,12b-tetrahydroisoindolo[1,2-a]isoquinoline hydrochloride

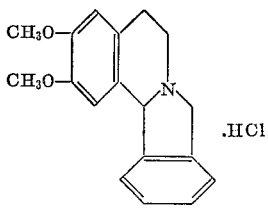

This example illustrates the preparation of 2,3-dimethoxy - 5,6,8,12b - tetrahydroisoindolo-[1,2-a]isoquinoline which is a Compound IVa, and may be used as an intermediate for the preparation of 2,3-dimethoxy-7-methyl-5,6,7,8-tetrahydrodibenz[c,f]azonine, which is a Compound V, as described in Example 6.

(a) Preparation of 2[2-(3,4-dimethoxyphenyl)ethyl]phthalimide

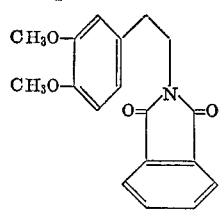

A solution of 108 parts of 3,4-dimethoxyphenylethylamine and 86 parts of phthalic anhydride in 200 parts by volume of ortho-dichlorobenzene is heated under reflux for 3 hours. After cooling, the solid product is collected by filtration and recrystallized from chloroform-methanol yielding 165 parts of Compound (a), M.P. 169° to 170° C.

(b) Preparation of 2[2-(3,4-dimethoxyphenyl)ethyl]-1-hydroxy-2,3-dihydro-1H-isoindol-3-one

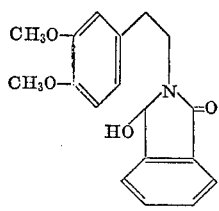

To a vessel, in a water bath at room temperature, is added with stirring 20 parts of Compound (a) suspended in 200 parts by volume of methanol. 3.2 parts of NaBH₄ in 50 parts by volume of methanol is added, and the mixture stirred for 40 minutes. The reaction mixture is filtered to remove 7 parts of unreacted starting material. The filtrate is diluted with water yielding 7.5 parts of Compound (b), M.P. 138° to 140° C.

(c) Preparation of 2,3-dimethoxy-8-oxo-5,6,8,12b-tetrahydroisoindolo[1,2-a]isoquinoline

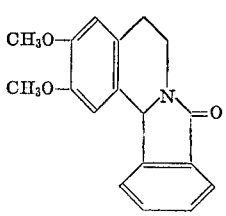

One part of Compound (b) in 10 parts by volume of methanol and 0.3 part by volume of concentrated hydrochloric acid are refluxed for one hour. The mixture is then diluted with water, yielding 0.9 part of crystals of Compound (c), M.P. 166° to 168° C.

(d) Preparation of 2,3-dimethoxy-5,6,8,12b-tetrahydroisoindolo[1,2-a]isoquinoline hydrochloride A slurry of 75 parts of Compound (c) in 2,000 parts by volume of tetrahydrofuran (THF) is added dropwise over 15 minutes to 1,010 parts by volume of a one molar THF solution of borane with stirring under nitrogen. After stirring for one half hour, the mixture is refluxed for 7 hours. With cooling, 300 parts by volume of 6 Normal hydrochloric acid is added and the mixture refluxed for 2 hours. The mixture is then concentrated under vacuum to 400 parts by volume. The concentrate is treated with 600 parts by volume of a 6 normal sodium hydroxide solution and extracted with methylene chloride. The methylene chloride solution is dried over sodium sulfate and evaporated. The residue is converted to the hydrochloride and crystallized from methanol, yielding 37 parts of the title compound which melted with decomposition at 244° C.

Following the procedure described in this example, but using 3-methoxy-4-methylphenylethylamine in place of the 3,4-dimethoxyphenylethylamine, the corresponding Compound IVa is obtained.

EXAMPLE 6

2,3-dimethoxy-7-methyl-5,6,7,8-tetrahydrodibenz[c,f]azonine

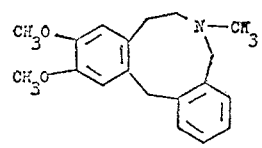

This example illustrates the preparation of 2,3-dimethoxy-7-methyl-5,6,7,8 - tetrahydrodibenz[c,f]azonine, i.e. a Compound V, by a process similar to that described in Example 2.

A solution of 32 parts of 2,3-dimethoxy-5,6,8,12b-tetrahydroisoindolo[1,2-a]isoquinoline in 85 parts by volume of methyl iodide, 35 parts by volume of ethanol and 175 parts by volume of ether is allowed to stand at room temperature for several hours, yielding 45 parts of the corresponding methiodide.

Eleven parts of sodium are added to 45 parts of the methiodide suspended in 700 parts by volume of liquid ammonia with stirring cooled in a solid carbon dioxide-acetone bath. After stirring for one hour the mixture is allowed to evaporate for 16 hours. The crude residue is crystallized twice from methanol to give 7 parts of the title compound, M.P. 102° to 104° C.

Following the procedure described in this example but using propyl iodide in place of the methyl iodide the corresponding Compound V is obtained.

EXAMPLE 7

2,3-dimethoxy-12b-phenyl-5,6,8,12b-tetrahydroisoindolo[1,2-a]isoquinoline

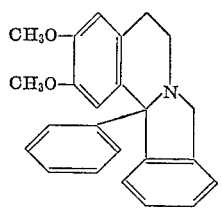

This example illustrates the preparation of 2,3-dimethoxy - 12b - phenyl-5,6,8,12b-tetrahydroisoindolo[1,2-a]isoquinoline, which is a Compound IVb by following a procedure according to reaction scheme B described above. The title compound may be used to prepare the corresponding Compound V, as illustrated by Example 8.

(a) Preparation of 2,3-dimethoxy-12b-phenyl-8-oxo-5,6,8,12b-tetrahydroisoindolo[1,2-a]isoquinoline

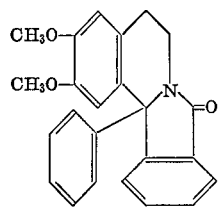

A solution of 18.1 parts of 3,4-dimethoxy phenylethylamine and 22.6 parts of ortho-benzoylbenzoic acid and 0.25 part of p-toluene sulfonic acid in 300 parts by volume of toluene is heated under reflux for about 16 hours. The reaction mixture is concentrated under vacuum and the residue dissolved in chloroform. The chloroform solution is washed with dilute aqueous sodium carbonate and water, dried over sodium sulfate and then evaporated yielding 25 parts of crude intermediate, 4 parts of which is then refluxed with 50 parts by volume of methanol and 1.5 parts by volume of hydrochloric acid for 4 hours. The mixture is then cooled and 3 parts of crystals of compound (a) are collected, M.P. 202° to 203° C.

(b) Preparation of 2,3-dimethoxy-12b-phenyl-5,6,8,12b-tetrahydroisoindolo[1,2-a]isoquinoline A solution of 70 parts of compound (a) in 1,500 parts by volume of THF is added dropwise over 30 minutes to 750 parts by volume of stirred one molar THF solution of borane under nitrogen. The mixture is refluxed for 7 hours, cooled, 250 parts by volume of 6 normal hydrochloric acid added and the mixture refluxed for 2 hours. The mixture is then concentrated under vacuum and the residue is treated with 500 parts by volume of 6 normal sodium hydroxide solution, and then methylene chloride is added. The methylene chloride layer is dried over sodium sulfate and evaporated. The residue is crystallized from ether yielding 67 parts of the title compound, M.P. 172° to 174° C.

Following the procedure as described in this example, but using ortho-(para-chlorobenzoyl)benzoic acid in place of the ortho-benzoylbenzoic acid, the corresponding Compound IVb is obtained.

EXAMPLE 8

2,3-dimethoxy-7-methyl-13-phenyl-5,6,8,13-tetrahydrodibenz[c,f]azonine hydrochloride

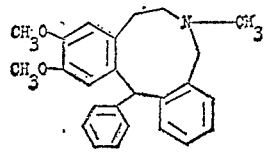

This example illustrates the preparation of a Compound V from the corresponding Compound IVb.

A solution of 6 parts and 15 parts by volume of methyl iodide, 25 parts by volume of ethanol and 25 parts by volume of methylene chloride is prepared and allowed to stand at room temperature for 16 hours. The solution is evaporated, the residue dissolved in acetone, and diluted with ether. Nine parts of the resultant methiodide are recovered as precipitate by filtration.

Thirty-six parts of the methiodide is treated with 9 parts of sodium suspended in 500 parts by volume of liquid ammonia, and the mixture evaporated and the product recovered, as described in Example 2. The product is twice crystallized from methanol yielding 7 parts of the title compound, M.P. 156° to 162° C.

Following the procedure of this example if propyl bromide is used in place of the methyl iodide, the corresponding Compound V is obtained.

EXAMPLE 9

12b-(p-chlorobenzyl)-2,3-dimethoxy-5,6,8,12b-tetrahydroisoindolo[1,2-a]isoquinoline

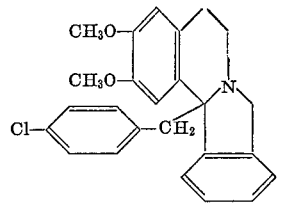

This example illustrates the preparation of 12b-(p-chlorobenzyl)-2,3-dimethoxy - 5,6,8,12b - tetrahydroisoindolo[1,2-a] isoquinoline, which is a compound IVc, according to reaction scheme C, as described above.

(a) Preparation of 12b - (p-chlorobenzyl)-2,3-dimethoxy-8-oxo-5,6,8,12b-tetrahydroisoindolo[1,2-a]isoquinoline

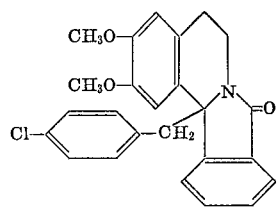

A Grignard reagent is prepared from 2 parts of magnesium and 12 parts of p-chlorobenzyl chloride in 100 parts by volume of ether, and added dropwise to a stirred suspension of 15.5 parts of N-[2-(3,4-dimethoxyphenyl)-ethyl]phthalimide (which may be prepared as described above in Example 5), in 200 parts by volume of THF. The mixture is stirred for 16 hours and then dilute ammonium hydroxide added. The organic layer is dried over sodium sulfate and evaporated to give a crystalline residue, which is then washed with a small amount of ether, yielding 16 parts of intermediate product. This intermediate product is heated under reflux for 16 hours in 300 parts by volume of methanol and 15 parts by volume of concentrated hydrochloric acid. The mixture is then evaporated and the residue crystallized from methanol yielding 11 parts of Compound (a), M.P. 193° to 194° C.

(b) Preparation of 12b(p-chlorobenzyl)-2,3-dimethoxy-5,6,8,12b-tetrahydroisoindolo[1,2-a]isoquinoline A solution of 55 parts of Compound (a) in 800 parts by volume of THF is added dropwise over 20 minutes to a solution of 17 parts of LAH in 1,500 parts by volume of ether and heated under reflux for 20 hours. The mixture is then cooled and decomposed by the addition of water, the mixture is then filtered through "Celite." The organic phase of the filtrate is dried and evaporated under vacuum and crystallized from ether to give 44 parts of the title compound, M.P. 126° to 127° C.

Following the general procedure described in this example, but using a Grignard reagent prepared from p-methoxybenzyl chloride in place of the p-chlorobenzyl chloride, the corresponding Compound IVc is obtained.

EXAMPLE 10

12b-benzyl-2,3-dimethoxy-5,6,8,12b-tetrahydroisoindolo[1,2-a]isoquinoline

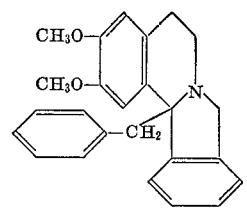

This example illustrates the preparation of 12b-benzyl-2,3 - dimethoxy - 5,6,8,12b - tetrahydroisoindolo[1,2-a] isoquinoline, which is a Compound IVc.

(a) Preparation of 12b-benzyl-2,3-dimethoxy-8-oxo-5,6,8,12b-tetrahydroisoindolo[1,2-a]isoquinoline

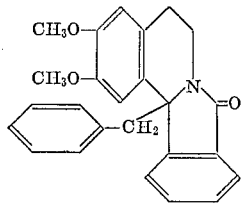

Following the procedure described above in Example 9, a Grignard reagent is prepared from 13.3 parts of magnesium and 95.2 parts of benzyl chloride in 800 parts by volume of ether, and reacted with 108 parts of 2-[2-(3,4 - dimethoxyphenyl)ethyl]phthalimide suspended in 1,500 parts by volume of THF, yielding 120 parts of intermediate product which is then heated under reflux in 2,000 parts by volume of methanol and 150 parts by volume of concentrated hydrochloric acid for 20 hours. The reaction mixture is evaporated and the residue crystallized from methanol to give 90 parts of Compound (a), M.P. 175° to 176° C.

(b) Preparation of 12b-benzyl-2,3-dimethoxy-5,6,8,12b-tetrahydroisoindolo[1,2-a]isoquinoline Following the procedure described above in Example 9, a solution of 85 parts of Compound (a) in 1,000 parts by volume of THF is mixed with 40 parts of LAH in 2,000 parts by volume of ether and the mixture refluxed 24 hours. The reaction mixture yields 53 parts of the title compound crystallized from ether, M.P. 130° to 131° C.

Replacement of the benzyl chloride with a 3,4,5-trimethylbenzyl chloride results in the preparation, in a similar manner, of the corresponding Compound IVc.

What is claimed is:

1. A compound which in its free base form is of the formula:

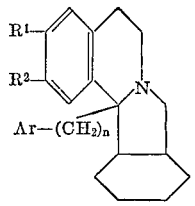

wherein $n$ is 0 or 1

$R^1$ and $R^2$ are independently either a hydrogen atom, a linear alkyl group having from one to four carbon atoms, a linear alkoxy group having from one to four carbon atoms, or $R^1$ and $R^2$ may be joined to form a methylenedioxy group, and Ar is a group of the formula

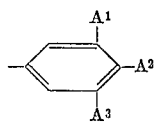

wherein $A^1$, $A^2$ and $A^3$ are independently a hydrogen atom; a fluorine atom, a bromine atom; a linear alkyl group having from one to four carbon atoms; or a linear alkoxy group having from one to four carbon atoms; or taken together with its adjacent counterpart, a methylenedioxy group.

2. A compound which in its free base form is of the formula:

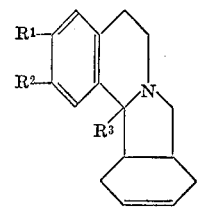

wherein $R^1$ and $R^2$ are independently either a hydrogen atom; a linear alkyl group having from one to four carbon atoms; or a linear alkoxy group having from one to four carbon atoms;

or $R^1$ and $R^2$ may be joined to form a methylenedioxy group; and $R^3$ is a hydrogen atom; or a group of the formula

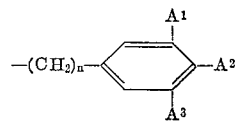

wherein $n$ is 0 or 1; and $A^1$, $A^2$ and $A^3$ is independently a hydrogen atom; a fluorine atom; a chlorine atom; a bromine atom; a linear alkyl group having from one to four carbon atoms; or a linear alkoxy group, having from one to four carbon atoms; or taken together with its adjacent counterpart, a methylenedioxy group.

3. A compound according to claim 2 wherein $R^1$ and $R^2$ are a methoxy group and $R^3$ is a hydrogen atom.

4. A compound which in its free base form has the formula:

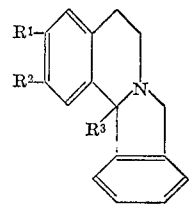

wherein $R^1$ and $R^2$ are independently either a hydrogen atom, a linear alkyl group having from one to four atoms, a linear alkoxy group having from one to four carbon atoms, or $R^1$ and $R^2$ may be joined to form a methylenedioxy group, and $R^3$ is either a hydrogen atom or a group of the formula:

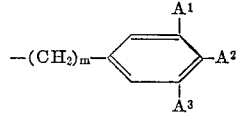

wherein $m$ is 0 or 1; and $A^1$, $A^2$ and $A^3$ are independently a hydrogen atom; a fluorine atom; a chlorine atom; a bromine atom; a linear alkyl radical having from one to four carbon atoms; or a linear alkoxy group, having from one to four carbon atoms; or taken together with its adjacent counterpart, a methylenedioxy group.

5. A compound according to claim 4 wherein $R^1$ and $R^2$ each are a methoxy group and $R^3$ is a hydrogen atom.

6. A compound according to claim 4 wherein $R^1$ and $R^2$ each are a methoxy group and $R^3$ is a phenyl group.

7. A compound according to claim 4 wherein $R^1$ and $R^2$ each are a methoxy group and $R^3$ is a benzyl group.

8. A compound according to claim 4 wherein $R^1$ and $R^2$ each are a methoxy group and $R^3$ is a p-chlorobenzyl group.

References Cited

UNITED STATES PATENTS

| | | | |
|---|---|---|---|
| 3,336,318 | 8/1967 | Brown | 260—289 X |
| 3,426,027 | 2/1969 | Muller | 260—289 |
| 3,502,679 | 3/1970 | Houlihan | 260—288 X |
| 3,516,993 | 6/1970 | Houlihan | 260—289 X |

DONALD G. DAUS, Primary Examiner

U.S. Cl. X.R.

260—286 Q